United States Patent [19]

Cassity et al.

[11] Patent Number: 5,109,897
[45] Date of Patent: May 5, 1992

[54] WIRE PROTECTION SYSTEM FOR ELECTRICAL ENCLOSURES

[75] Inventors: Terry A. Cassity, Paris; Jeffrey O. Sharp, Lexington, both of Ky.

[73] Assignee: Square D Company, Palantine, Ill.

[21] Appl. No.: 624,835

[22] Filed: Dec. 10, 1990

[51] Int. Cl.⁵ .............................................. B27M 3/00
[52] U.S. Cl. ........................ 144/144.5 GT; 33/197; 409/130; 144/144 R; 144/372
[58] Field of Search ..................... 409/130; 33/197; 144/144 R, 144.5 GT, 372, 144.5

[56] References Cited
U.S. PATENT DOCUMENTS

D. 306,250  2/1990  Kyrklund .................. 14/144.5 GT

Primary Examiner—W. Donald Bray
Attorney, Agent, or Firm—Jose W. Jimenez; Nicholas A. Camasto

[57] ABSTRACT

A wire protection device and system that can operate in combination with non-metallic and metallic enclosures to help prevent damage to branch wiring during drywall installation. In some instances, the device serves to prevent the branch wires from being dislodged from the enclosure. The wire protection device may also be made to fit into a wire clamping system that is molded integrally with non-metallic enclosure.

4 Claims, 5 Drawing Sheets

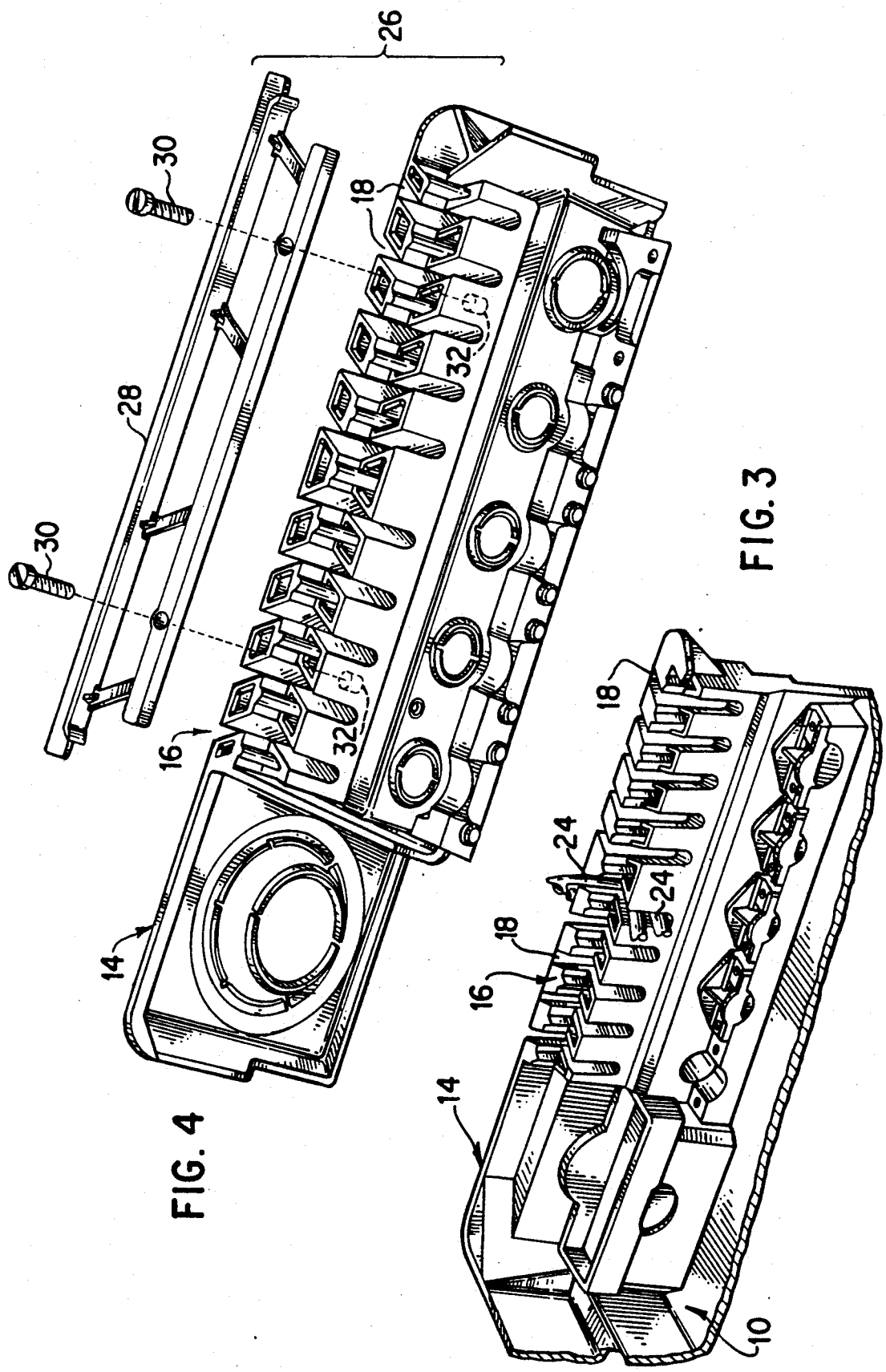

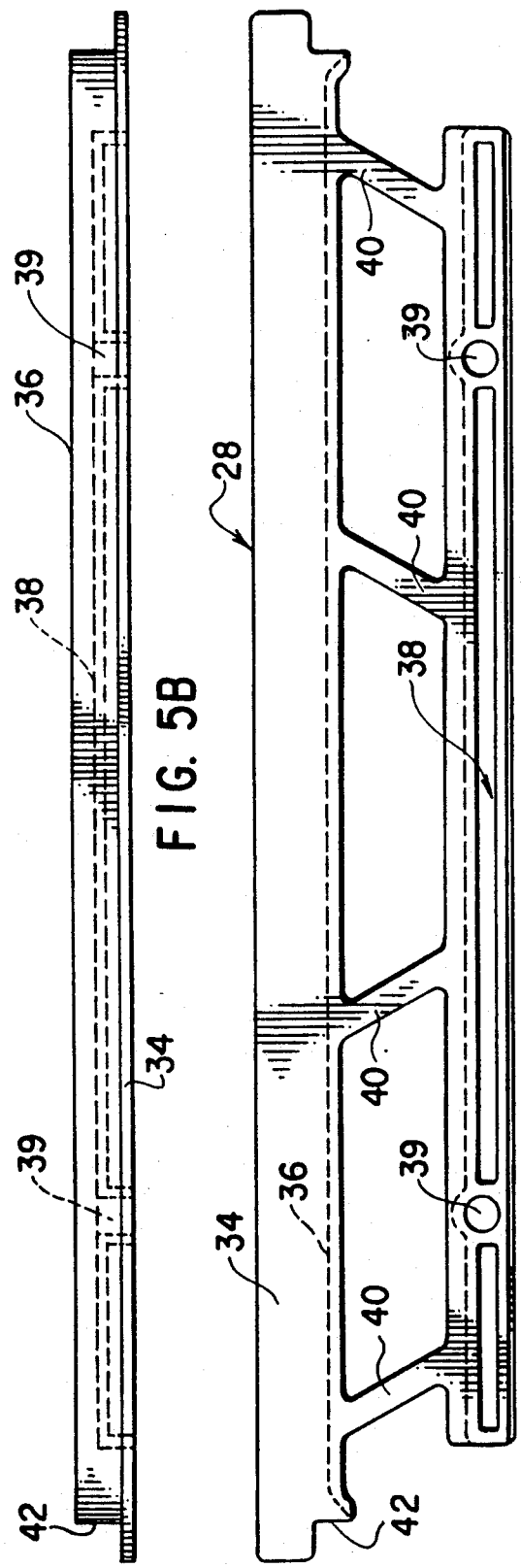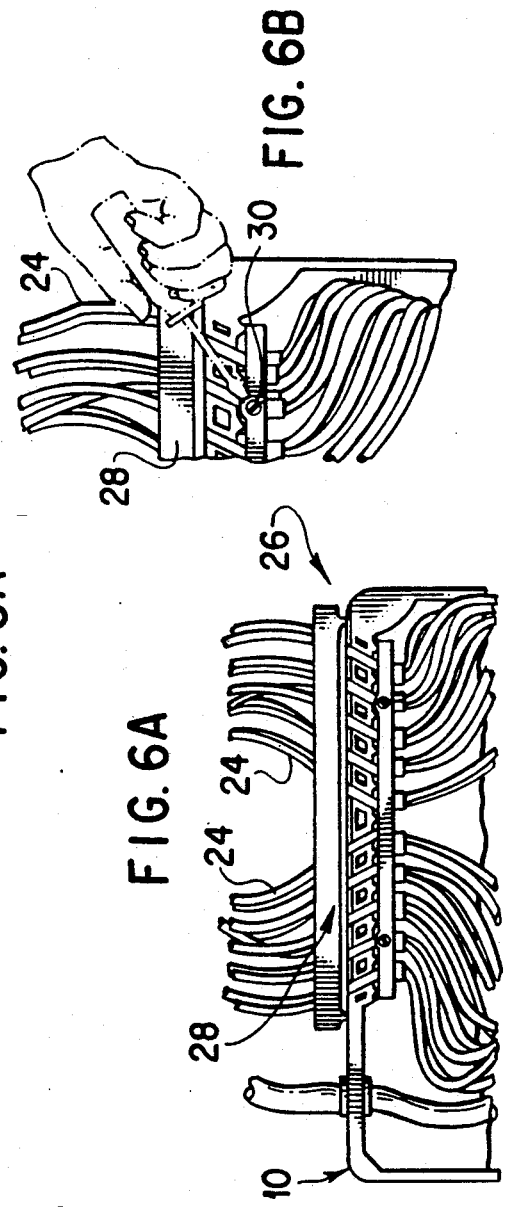

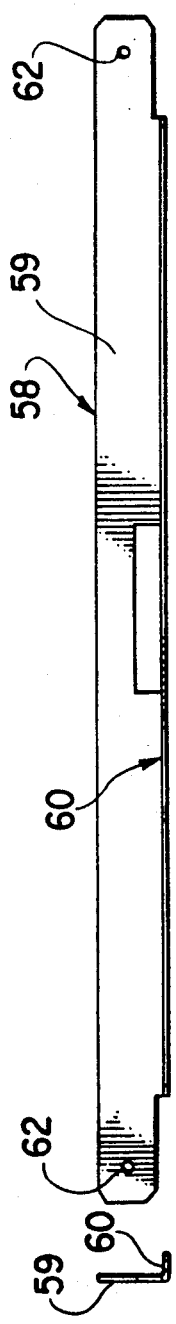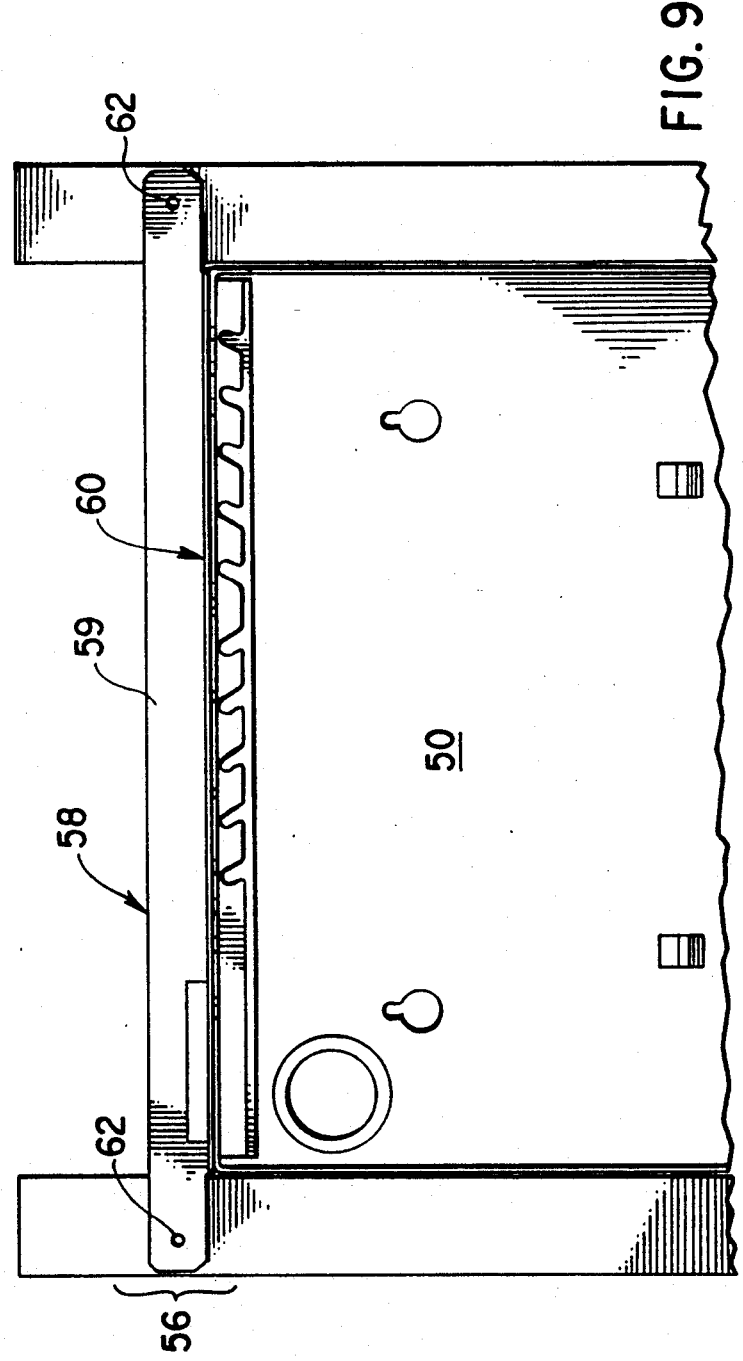

WIRE PROTECTION SYSTEM FOR ELECTRICAL ENCLOSURES

CROSS REFERENCE TO RELATED APPLICATION

This application is related to co-pending application entitled "Improved Electrical Load Center" to Sharp et al., having Ser. No. 382,830, and is incorporated herein by reference.

TECHNICAL FIELD

The present invention relates generally to electrical enclosures and more particularly to a compact wire shield for use with electrical enclosures.

BACKGROUND OF THE INVENTION

Electrical enclosures and circuit breaker load centers are typically installed on finished or unfinished walls between 2×4 studs. Usually the walls are covered with drywall and the installers must use a knife or router to cut out the openings for the electrical equipment. The router is used to cut the drywall around the enclosure, once the enclosure has been completely wired, and follows the outline of the electrical enclosure. At times the router bit may penetrate too deeply and cut the insulation on the wiring entering the enclosure. When this occurs, the electrician must install a junction box and splice the wiring that has been damaged. Sometimes, the electrician may not know that the damage has occurred until long after the drywalling is complete. This may result in later cutting the drywall and fixing the wiring that has been damaged by the router.

In the past nail plates were used to protect non-metallic cable where it is installed in 2×4 wall studs. The plate is typically fastened to the face of the 2×4 to prevent any nail from piercing the cable. These nail plates, however, do not provide protection to the wires entering the enclosure since the wiring is typically between the two studs. Therefore, there is a need for a device that will complement the electrical enclosure which will be easy to install and will shield the cable (or wiring) entering the enclosure while the installer cuts around the electrical enclosure. In addition, it would be desirable to have such a device that would assist the installer in guiding the router bit along the perimeter of the enclosure while the drywall is being cut.

SUMMARY OF THE INVENTION

According to the teachings of the present invention, a wire protective device for use with an electrical enclosure has been developed which shields the wire or cable that is going into the electrical enclosure from being cut during installation. In particular, the wire protective device consists of an elongated frame formation having apertures therein and an elongated ridge protruding therefrom running substantially the length of the formation. The wire protective device may be made out of a metallic or a non-metallic material.

According to another aspect of the present invention, there is disclosed a wire protection system which comprises an electrical enclosure having end walls and an elongated frame formation having apertures therein for positioning the formation adjacent the enclosure. The formation further includes an elongated ridge protruding therefrom running substantially the length of the formation. The enclosure and formation, in combination, operate to protect wires protruding out from the enclosure during drywall installation. The wire protection system is also capable of preventing wires from coming away from the enclosure, as well as providing a shielding function for the wires during drywall installation.

A principal object of the invention is to provide a wire protective device for use with electrical enclosures. Another object of the invention is to provide a wire protective device which assists in securing the cables entering the enclosure to the enclosure. A further object of the invention is to provide a device that assists in the installation of drywall around the enclosures.

BRIEF DESCRIPTION OF THE DRAWINGS

These and other objects and advantages of the invention will be apparent upon reading the following description in conjunction with the drawings in which:

FIG. 3 is an enlarged, exploded view of an enclosure illustrating the clamping system of the electrical enclosure of FIG. 1;

FIG. 4 is an exploded view of the wire protection system;

FIGS. 5A and 5B are top and side views of the elongated frame wire shield;

FIG. 6 illustrates the wire protection system in a non-metallic enclosure;

FIGS. 8A and B illustrate another embodiment of the wire shield; and

FIG. 9 illustrates the plan view of the wire protection system for use with a metal electrical enclosure.

DETAILED DESCRIPTION OF THE PREFERRED EMBODIMENTS

Figure 1:
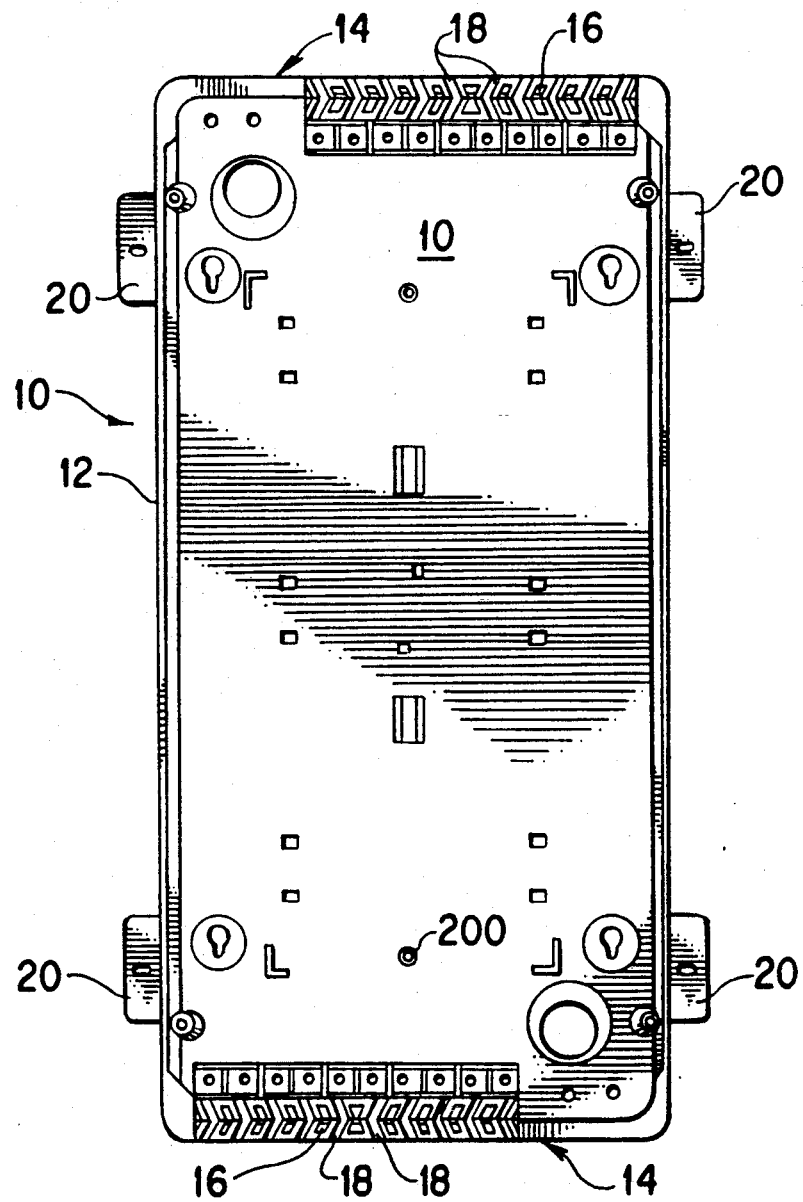
FIG. 1 is a plan view of a non-metallic electrical enclosure.
Figure 2:
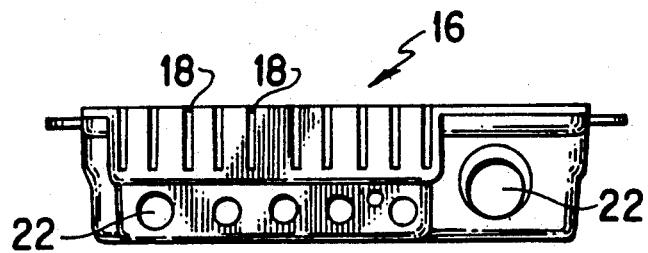
FIG. 2 is an end view of the enclosure.

Referring now to the figures, FIGS. 1-3 illustrate a non-metallic enclosure 10 having sidewalls 12 and end walls 14. In end walls 14 there is a molded-in wire clamping system 16 having wire (or cable) channels 18. Enclosure 10 also has mounting flanges 20, along with cable knock-outs 22 of various sizes to accommodate cables of different sizes into the electrical enclosure. (See FIG. 2).

Referring further to FIG. 3, there is illustrated, in more detail, wire clamping system 16 which include wire channels 18 for accommodating wire or cables such as cable 24. Typically non-metallic (NM-B) cables are slipped into the cable clamping system in a V-shaped channel in order to secure the cable to the enclosure. However, since the wire channels may accommodate two wires of cable, it is possible for the cable closest to the wire channel opening to slip free from its channel during enclosure installation. In addition, the cables outside the enclosure are exposed and may be damaged during drywall installation. Therefore, there is a need for a device which will shield the outside cable during drywall installation while maintaining the cables in the channels during installation.

Referring now to FIG. 4, there is illustrated an exploded view of a wire protection system 26. In particular, system 26 includes an elongated frame wire shield 28 that is mountable through clamping system 16 and fits within some of the wire channels 18. Shield 28 is secured to enclosure 10 via mounting screws 30 which mount to screw apertures 32 that are molded into enclosure 10. FIGS. 5A and B illustrate the wire shield which includes a first elongated formation 34 to help shield the branch wires from possible router damage when the shield is installed with the enclosure. The wire shield 28 further includes an elongated ridge 36 which assists the installer in moving the router along the edge of the enclosure. Shield 28 further includes a second elongated formation 38 which helps to secure the cables to the enclosure and prevent the cables from coming away from wire clamping system 16. Formation 38 further includes mounting apertures 39 to help position and mount wire shield 28 to the enclosure. Wire shield 28 includes bridges or legs 40 which secure formation 34 and 38 together. Bridges 40 are made such that they are insertable into the wire channels of clamping system 16.

In a specific embodiment of the shield, shield 28 is made of a molded thermoplastic part having two parallel straps of approximately $8\frac{7}{8}''$ and $10\frac{3}{4}''$, respectively. The strips are connected by four opposing angular bridges or legs 40. Formation 34 has a 0.300 inch tall vertical rib (36) running its entire length for added support and to provide a guide for a router bit. Formation or strap 34 also has a $\frac{1}{4}'' \times \frac{1}{4}''$ notch (42) on each end to trap the router bit if it is protruding below the level of the shield. This prevents the router from travelling up the side of shield 28, across the upper edge and damaging the wiring. Strap or formation 38 is 7/16" wide by $\frac{1}{4}''$ thick and serves as the retaining strap or means. It is mounted to the enclosure with two screws placed approximately $2\frac{1}{8}''$ from the center line of the part. The retaining strap prevents the wires from being dislodged from the wire clamping system 16.

FIG. 6 illustrates the wire protection system 26 installed in enclosure 10. In its fixed position elongated ridge 36 of shield 28 rests on top of enclosure 10 and helps to guide the router during installation. As is illustrated, the shield 28 serves to shield the wires from possible router damage and secures the wires in the clamping system.

Figure 7:
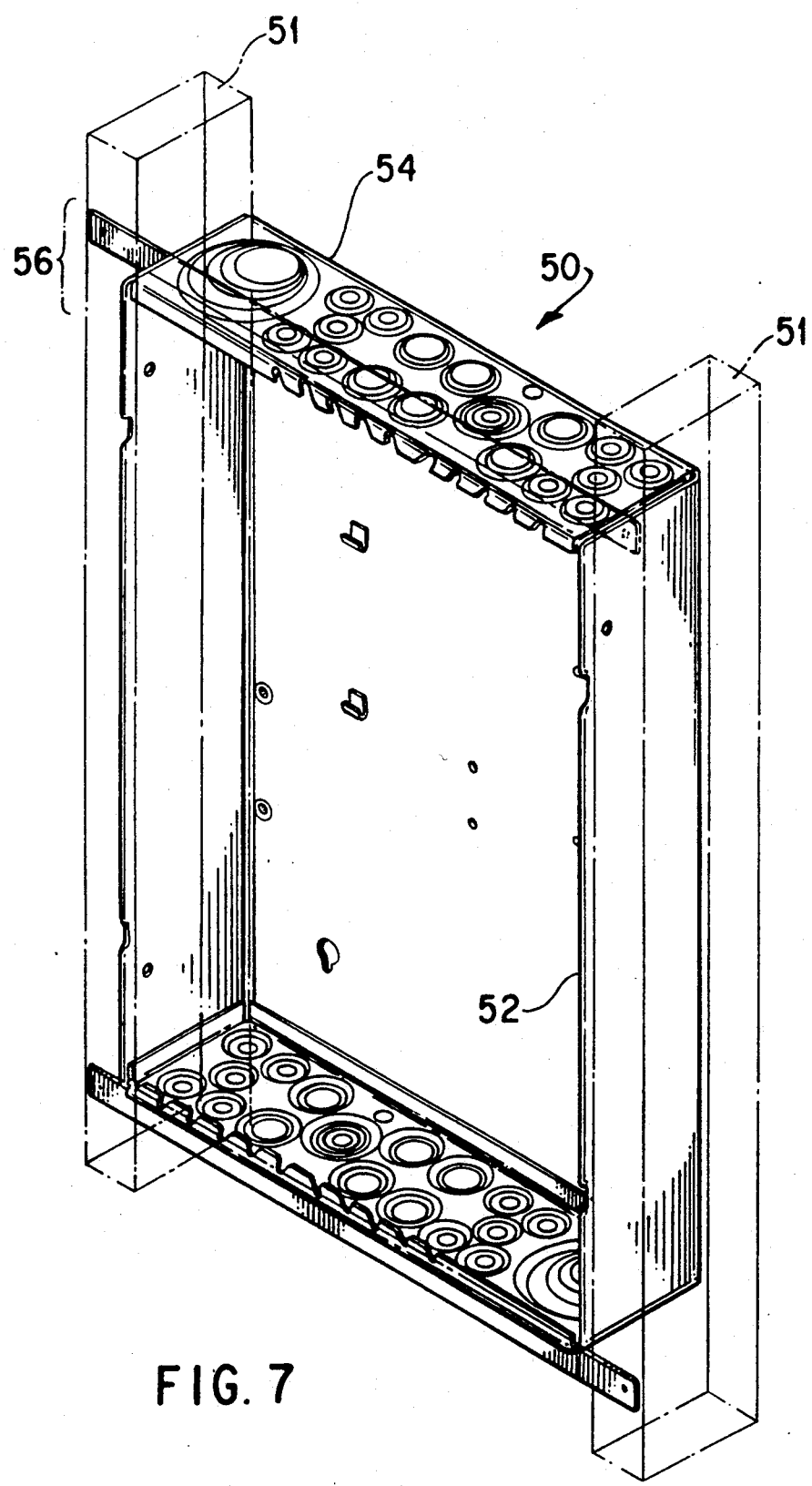
FIG. 7 illustrates the use of a wire protection system for a metallic enclosure.

Referring now to FIG. 7, there is illustrated another embodiment of the present invention which may be used in connection with metallic electrical enclosures. In particular, metallic enclosure 50 is shown installed between studs 51, having sidewalls 52 and endwalls 54. Wire protection system 56 is also illustrated therein.

Referring to FIGS. 8A and 9, wire protection system 56 comprises an elongated frame wire shield 58 in combination with enclosure 50. In particular, shield 58 includes an elongated formation 59 and an elongated ridge 60, along with mounting apertures 62. Shield 58 is mounted adjacent or in contact with either end of enclosure 50 and can be attached to studs 51 by means of screws or nails. Formation 59 serves to shield the wire from being cut during drywall installation while ridge 60 helps to guide the router during installation.

In one example, the shield is made of an 18 gauge galvanized steel plate having a width of about 1.36" which is bent along a form line to give it the L appearance, as in FIG. 8B. It is typically 17 inches in length with apertures at either end of 0.187" in diameter. Formation 59 can be from 0.84 to 1" in width and ridge 60 may be around 0.44" in width. The shield may be made of other dimensions depending on the size of the electrical enclosure and the distance between the studs.

What has been described is a novel wire protection device that is easy to manufacture and install. It is recognized that numerous modifications and change in the described embodiment of the invention will be apparent to those skilled in the art without departing from its true spirit and scope. The invention is to be limited only as defined in the claims.

What is claimed is:

1. For use with an electrical enclosure box having at least one end wall defining a plurality of open channels for receiving external wires entering said enclosure box, a wire protection device comprising:
    a generally rectangular open frame having an elongated ridge overlying the portions of said external wires immediately adjacent said end wall of said enclosure box and at least two ribs configured to fit within corresponding ones of said channels; and
    means securing said frame to said enclosure box.

2. The protection device of claim 1 wherein the number of ribs is equal to the number of said plurality of open channels.

3. The protection device of claim 2 wherein said enclosure box is adapted for installation between studs in a drywall and wherein said ridge defines an external edge that functions as a guide for a routing tool for protecting said wires from damage during installation of said drywall.

4. A wire protection system comprising:
    an electrical enclosure box having end walls defining a plurality of open wire-receiving channels for receiving external wires entering said enclosure box;
    an open frame having an elongated ridge for shielding the portions of said external wires immediately adjacent said enclosure box and a plurality of ribs adapted to fit within corresponding ones of said open channels for securing said wires therein; and
    means securing said frame to said enclosure box.

* * * * *